United States Patent
Wiesinger et al.

(10) Patent No.: US 11,159,021 B2
(45) Date of Patent: Oct. 26, 2021

(54) FLEXIBLE REACTIVE POWER COMPENSATION

(71) Applicant: SIEMENS AKTIENGESELLSCHAFT, Munich (DE)

(72) Inventors: Markus Wiesinger, Pinzberg (DE); Sergey Kynev, Nuremberg (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 88 days.

(21) Appl. No.: 16/610,693

(22) PCT Filed: May 2, 2017

(86) PCT No.: PCT/EP2017/060399
§ 371 (c)(1),
(2) Date: Nov. 4, 2019

(87) PCT Pub. No.: WO2018/202279
PCT Pub. Date: Nov. 8, 2018

(65) Prior Publication Data
US 2021/0159703 A1 May 27, 2021

(51) Int. Cl.
*H02J 3/20* (2006.01)
*H02J 3/18* (2006.01)
*H02J 3/22* (2006.01)

(52) U.S. Cl.
CPC .......... *H02J 3/1842* (2013.01); *H02J 3/1864* (2013.01); *H02J 3/20* (2013.01); *H02J 3/22* (2013.01)

(58) Field of Classification Search
CPC .......... H02J 3/1842; H02J 3/1864; H02J 3/20; H02J 3/22
See application file for complete search history.

(56) References Cited

U.S. PATENT DOCUMENTS

| 5,889,662 A * | 3/1999 | Schettler | H02J 3/1857 363/40 |
| 2005/0194944 A1* | 9/2005 | Folts | H02J 3/1828 323/209 |
| 2013/0181796 A1* | 7/2013 | Weber | H01F 27/2885 336/60 |
| 2014/0268942 A1* | 9/2014 | Jiang Hafner | H02H 7/1255 363/53 |

(Continued)

FOREIGN PATENT DOCUMENTS

| CN | 1588746 A | 3/2005 |
| CN | 101567565 A | 10/2009 |

(Continued)

*Primary Examiner* — Harry R Behm
(74) *Attorney, Agent, or Firm* — Laurence A. Greenberg; Werner H. Stemer; Ralph E. Locher

(57) ABSTRACT

An arrangement for reactive power compensation at an electric energy transmission line includes at least one first reactive power compensation device including a first type of power electronic switches, at least one second reactive power compensation device including a second type of power electronic switches and a transformer having a first secondary coil connected to the first device, a second secondary coil connected to the second device and a primary coil connectable to the electric energy transmission line. The primary coil has more windings than any of the first and second secondary coils.

17 Claims, 1 Drawing Sheet

(56) References Cited

U.S. PATENT DOCUMENTS

2017/0353101 A1* 12/2017 Li ........................ H02J 3/1864
2019/0363538 A1* 11/2019 Kahkonen ............. H02J 3/1864

FOREIGN PATENT DOCUMENTS

| CN | 102110986 B | 8/2013 |
| CN | 104538966 A | 4/2015 |
| EP | 3349349 A1 | 7/2018 |

\* cited by examiner

FLEXIBLE REACTIVE POWER COMPENSATION

BACKGROUND OF THE INVENTION

Field of the Invention

The present invention relates to an arrangement and to a method for reactive power compensation at an electric energy transmission line.

Description of the Related Art

An electric transmission line may transmit active power and reactive power over wide distances at high voltage. The electric energy transmission line may be connected to a utility grid operated by a grid operator. The grid operator may require different amounts of reactive power supplied to the utility grid. Thus, it may be required to provide equipment connectable to the electric energy transmission line which enables consumption and/or production of reactive power, such as capacitive reactive power and/or inductive reactive power.

Conventionally, passive or active devices have been used for this purpose. For example, passive devices may include a capacitor or an inductor which may for example be shunt-connected to the electric energy transmission line. Active devices may include high power switches, such as high power transistors or thyristors.

It has however been observed that the conventional systems and methods for providing reactive power compensation have several problems or disadvantages for compensating reactive power as required or demanded by a grid operator, for example.

Thus, there may be a need for an arrangement and for a method for reactive power compensation at an electric energy transmission line, wherein conventional problems and disadvantages are at least reduced.

SUMMARY OF THE INVENTION

This need may be met by the subject matter according to the independent claims. Advantageous embodiments of the present invention are described by the dependent claims.

According to an embodiment of the present invention it is provided an arrangement for reactive power compensation (of a high voltage) at an electric energy transmission line, the arrangement comprising: at least one, in particular a first group of, first reactive power compensation device each comprising a first type of power electronic switches; at least one, in particular a second group of, second reactive power compensation device each comprising a second type of power electronic switches; and a transformer having a first secondary coil (also referred to as first secondary winding) connected to the first reactive power compensation device and having a second secondary coil (also referred to as second secondary winding) connected to the second reactive power compensation device and having a primary coil (primary winding) connectable to the electric energy transmission line, the primary coil having more windings than any of the secondary coils.

The electric energy transmission line may be an overhead transmission line or an underground energy transmission line. The electric energy transmission line may be adapted and may be operable to transmit a multiphase power flow, such as a 3-phase power flow. The electric energy transmission line may be at one or at both ends connected (possibly via one or more transformers) to a utility grid or to several utility grids operating at a voltage lower than the voltage of the energy stream in transmission. The first group as well as the second group of reactive power compensation devices may each comprise at least one reactive power compensation device or in particular plural reactive power compensation devices which may be connected in parallel to the first secondary coil and the second secondary coil, respectively. In particular, for each device of the first group and the second group of reactive power compensation devices, a particular switch may be arranged between the respective secondary coil and an input terminal of the respective reactive power compensation device. Thereby, any of the reactive power compensation devices of the first group and/or of the second group may be connected or disconnected, as required or as demanded, or as needed for appropriate reactive power compensation.

The first group and the second group of reactive power compensation devices may require different operation conditions, such as electric operation conditions, with respect for example to voltage, power, electrical rating, etc. The respective secondary coils, i.e. the first and the second secondary coil, may therefore in particular be adapted to provide a voltage at their output terminal which is appropriate to the respective first group and the second group of reactive power compensation devices.

Under particular conditions during operation of the arrangement, one of the first group and the second group of reactive power compensation devices may not be required for reactive power compensation. In such a case, some or all the reactive power compensation devices of the first group or some or all of the reactive power compensation devices of the second group may be disconnected from their respective secondary coil. Depending on the type or degree of required reactive power compensation, one or more reactive power compensation devices of the first group and/or the second group may then be connected to their respective secondary coil.

Any of the reactive power compensation devices may be configured or capable of consuming and/or producing reactive power, in particular consuming or producing inductive reactive power and/or capacitive inductive power. Thereby, all requirements for reactive power compensation at the electric energy transmission line may be met using the arrangement according to an embodiment of the present invention.

The power electronic switches may in particular comprise transistors and/or thyristors. The power electronic switches may be configured to operate under medium voltage, such as in the range between 1 kV and 100 kV and adapted to be operable at currents between 100 A and 5000 A, for example. However, these electrical ratings may be different for the first group and the second group of reactive power compensation devices. Thus, the first and the second secondary coil may be configured differently in order to be capable for providing the electric voltage and/or current which is within the accepted operational range of the respective first group or second group of the reactive power compensation devices.

At the electric energy transmission line, a higher voltage may be present than at the output terminals of the first and the second secondary coils. Thus, also the first group and the second group of reactive power compensation devices may be operated at a voltage or at different voltages being different and lower than the voltage present at the electric energy transmission line. Thereby, a large flexibility for providing reactive power compensation using different types of reactive power compensation devices may be enabled, without damaging the respective reactive power compensation devices, since they can be operated in their permissive operational regimes.

According to an embodiment of the present invention, the first secondary coil has a first number of windings (turns around a stator tooth), wherein the second secondary coil has a second number of windings (turns around a stator tooth), wherein the first number is different from, in particular larger than, the second number.

When the first number of windings is larger than the second number of windings, the voltage at the electric energy transmission line is transformed down to a first voltage at an output terminal of the first secondary coil and is transformed down to a second voltage at the output terminal of the second secondary coil, wherein the first voltage is higher than the second voltage, but both the first voltage and the second voltage are lower than the voltage at the primary coil, thus the voltage at the electric energy transmission line. In particular, one or both of the first secondary coil and/or the second secondary coil may be configured as tap secondary coils, which may enable to operate a changeable number of first windings and/or second windings, in order to appropriately adjust the first voltage and/or secondary voltage, in particular depending on the number and/or kind of reactive power compensation devices of the first group and/or the second group.

According to an embodiment of the present invention, the first type power electronic switches are operable at a first operation voltage range, wherein the second type power electronic switches are operable at a second operation voltage range, wherein the first operation voltage range comprises higher voltages than the second operation voltage range.

The first operation voltage range may be provided or produced by the first secondary coil and the second operation voltage range may be provided or produced by the second secondary coil, thus the first group and the second group of reactive power compensation devices may be operated at their optimum operational conditions, thereby reducing a number of these devices which have to be installed.

According to an embodiment of the present invention, the first secondary coil has a first electrical rating, wherein the second secondary coil has a second electrical rating, different from the first electrical rating. The rating may define an operational range, regarding voltage and/or current and/or power. In turn, the first and the second secondary coil may be configured to meet the respective ratings of the compensation devices of the first group and the second group. For example, the secondary coils may be characterized by the number of windings, the type and size and material of the conductor wound to create the winding and the type of the turns or windings. As the skilled person understands, the characteristics of the first and the second secondary coil may influence the electrical output properties, such as voltage and/or current and/or power which may therefore be adapted to meet the requirements of the respective first group and second group of the compensation devices. According to an embodiment of the present invention, the first type of power electronic switches is enabled to be controlled to enter a non-conductive state and in particular comprises at least one of: an isolated gate bipolar transistor (IGBT); an integrated gate-commutated thyristor (IGCT); a gate turn-off thyristor (GTO).

In the non-conductive state, the power electronic switch may interrupt conduction of a current, while in a conductive state, the current may be allowed to flow. According to an embodiment of the present invention, the first reactive power compensation device may be configured as STATCOM. The core of a STATCOM (STATic synchronous COMpensator) may be the Voltage Sourced Converter. The ac voltage output of the Voltage Sourced Converter may be controlled such that it is just right for the required reactive current flow. The main components may be one or more DC capacitors and number of forced-commutated power electronic switches (e.g. IGBTs, IGCTs, GTOs). For any ac bus voltage dc capacitor voltage may be automatically adjusted as required to serve as a voltage source for the converter. From a dc input voltage source, provided by the charged DC capacitors, the converter may produce a set of controllable three-phase output voltages with the frequency of the ac power system. Each output voltage may be in phase with the corresponding ac system voltage via a relatively small inductance. By varying the amplitude of the output voltages produced, the reactive power exchange between the converter and the ac system may be controlled.

According to an embodiment of the present invention, the second type of power electronic switches is not enabled to be controlled to enter a non-conductive state, in particular comprising at least one of: a thyristor switched capacitor; a thyristor switched reactor. Other elements are possible.

According to an embodiment of the present invention, a first impedance of the transformer between the primary coil and the first secondary coil is higher than a second impedance of the transformer between the primary coil and the second secondary coil, thereby enabling damping harmonics generated be the first group of power electronic switches.

For example, the first group of reactive power compensation devices may produce higher amplitudes of harmonics (of a base or fundamental AC frequency which may be for example 50 Hz or 60 Hz) than the second group of reactive power compensation devices. In particular, the first impedance (in particular for the expected or actual harmonics produced by the first group of reactive power compensation devices) may be higher than the second impedance (for the same frequency range, in particular), to effectively dampen the harmonics produced by the first group of reactive power compensation devices. The required first impedance may be achieved by appropriately constructing the secondary coil regarding winding topology, material of the wire, material of the stator core, etc., as is known to the skilled person. Thereby, the reactive power compensation may be further improved.

According to an embodiment of the present invention, the second secondary coil is substantially decoupled from the first secondary coil. Thereby, it may be achieved to reduce a coupling between the secondary coils in order to reduce influence of the harmonics produced by the first group of compensation devices to the second group of compensation devices. Decoupling may be achieved by appropriately separating any coil windings of the second secondary winding from windings of the first secondary winding.

According to an embodiment of the present invention, the first group and the second group of power electronics devices are shunt connectable. One terminal of the power electronics devices may be floating, not being connected to any voltage or ground. In particular, current flow to ground may be avoided. Thereby, conventional reactive power compensation devices may be supported.

According to an embodiment of the present invention, the transformer may have a third secondary coil for auxiliary equipment, in particular having lower electrical rating and/or lower number of windings than any other of the secondary coils. Thereby, auxiliary equipment may be supplied with electric energy, for example for control and/or monitoring purposes.

According to an embodiment of the present invention, the electric energy transmission line is operable at a voltage between 100 kV and 500 kV, wherein the first secondary coil transforms to a voltage between 10 kV and 70 kV, wherein the second secondary coil transforms to a voltage between 10 kV and 50 kV. Thereby, conventionally used voltages may be supported.

According to an embodiment of the present invention it is provided an arrangement according to one of the preceding embodiments, further comprising: for at least one, in particular for every, device of the first group of reactive power compensation devices a switch connected between the first secondary coil and the device; for at least one, in particular for every, device of the second group of reactive power compensation devices a switch connected between the second secondary coil and the device.

It should be understood that features, individually or in any combination, disclosed, described or explained for an arrangement for reactive power compensation at an electric energy transmission line may also be applied, individually or in any combination, to a method of reactive power compensation according to an embodiment of the present invention and vice versa.

According to an embodiment of the present invention it is provided a method of reactive power compensation at an electric energy transmission line, the method comprising: connecting a primary coil of a transformer to the electric energy transmission line; connecting a first secondary coil of the transformer to a first reactive power compensation device comprising a first type of power electronic switches; connecting a second secondary coil of the transformer to a second reactive power compensation device comprising a second type of power electronic switches, the primary coil having more windings than any of the secondary coils.

Embodiments of the present invention use shunt-connected types of flexible AC transmission systems (FACTS) as reactive power compensation devices based on power electronics of different art. The reactive power compensation devices may for example comprise thyristor-switched reactor (TSR), thyristor-switched capacitor (TSC), thyristor-controlled reactor (TCR) as well as STATCOM based on power electronics with turn-off capabilities, such as IGBTs, IGCTs, GTOs, etc. Shunt-connected FACTS may consist of one or several branches, wherein each branch may be of a particular or different art. Such combination may be called static VAR compensator (SVC), STATCOM, hybrid SVC, hybrid STATCOM, etc. Due to the certain technical and/or economical limitations, such devices could be connected to a certain voltage level which depending on the size and type of the device is on low or medium voltage level. Embodiments of the present invention enable to connect different kinds of devices to different, normally different voltage levels.

According to an embodiment of the present invention, a FACTS device comprising several branches may be connected to the network using a step-up transformer with two secondary windings. The branches of the FACTS device may be split between these secondary windings. In particular, the branches may be split into two groups, wherein one group is connected to one secondary winding and the second group is connected to another secondary winding. Each of such group may consist of one or more branches. The secondary windings may or may not have different MVA and voltage level. Such windings may be labelled as secondary one and secondary two or as secondary and tertiary, or any other labels. Such transformer may or may not have an additional fourth winding used for auxiliary systems, which has normally much smaller MVA and voltage rating than the other secondary windings.

One advantage of embodiments of the present invention may be the possibility to individually choose the voltage level and MVA rating for each secondary winding of the first and second secondary coil. Therefore, all branches of one FACTS device do not need to be connected to the same voltage, but could be split into two groups. Each group could utilize the economically optimal voltage level or impedance of the dedicated secondary winding. This may lead to a more cost-optimized solution for a shunt FACTS device configuration.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DESCRIPTION OF THE INVENTION

Figure 1:
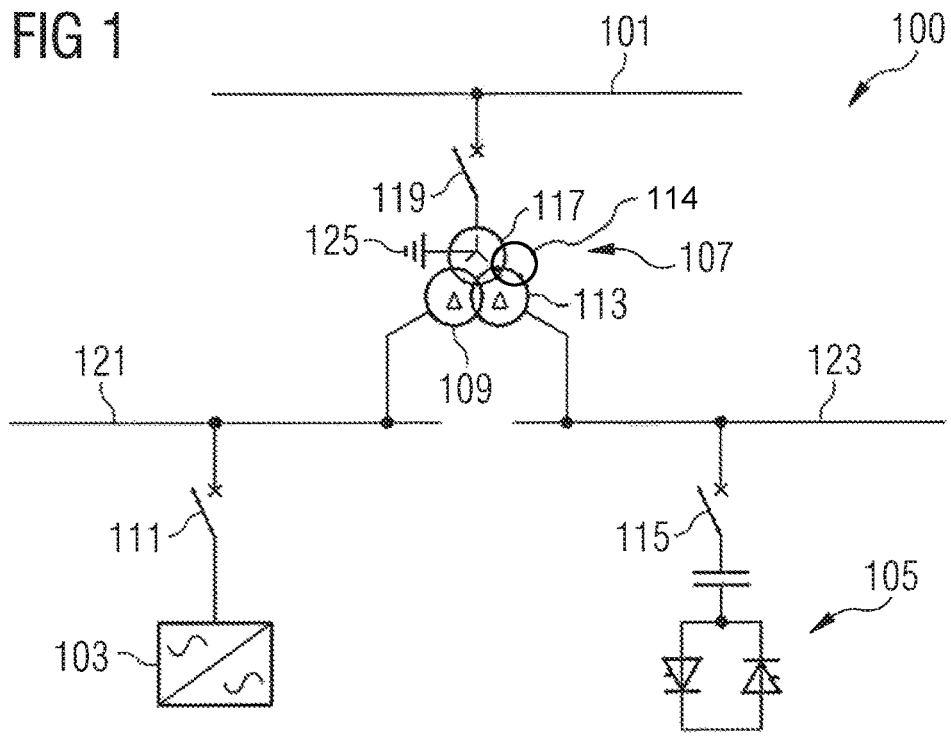
FIG. 1 schematically illustrates an arrangement for reactive power compensation according to an embodiment of the present invention.

The illustration in the drawings is in schematic form. It is noted that in different figures, similar or identical elements are provided with the same reference signs or with reference signs, which are different from the corresponding reference signs only within the first digit.

The arrangement 100 for reactive power compensation at an electric energy transmission line 101 comprises a first reactive power compensation device 103 comprising a first type of power electronic switches. The arrangement 100 further comprises a second reactive power compensation device 105 comprising a second type of power electronic switches. The arrangement 100 further comprises a transformer 107 having a first secondary coil 109 connected to the first reactive power compensation device 103 via a switch 111. Thus, the first reactive power compensation device 103 is connectable to the first secondary coil 109 of the transformer 107. The transformer 107 further comprises a second secondary coil 113 which is connected via a switch 115 to the second reactive power compensation device 105. Thus, the second secondary coil 113 is connectable to the second reactive power compensation device 105. The transformer 107 also comprises a third secondary coil 114 for auxiliary equipment.

The transformer 107 further comprises a primary coil 117 which is connectable via the switch 119 to the electric energy transmission line 101. The energy transmission line 101 may operate at a voltage of 400 kV, for example carrying three phases of AC voltage having a frequency for example of 50 Hz or 60 Hz. Other values are possible.

The first secondary coil 109 is connected to a first bus bar 121 at which plural other first reactive power compensation devices may be connectable, in order to form a first group of reactive power compensation devices. Furthermore, the second secondary coil 113 is connected to a second bus bar 123 to which plural other second reactive power compensation devices may be connectable to form a second group of reactive power compensation devices. The first bus bar is operating e.g. at a voltage of for example 37 kV, while the second bus bar 123 is operating at a voltage of for example 19 kV as a result of the different number of windings of the first and the second secondary coils 109, 113. In particular, the first secondary coil may have a larger number of windings than the second secondary coil 113.

The first reactive power compensation device 103 may comprise for example one or more controllable switches which may be operated at higher voltages than controllable switches comprised in the second reactive power compensation device 105. The first reactive power compensation device may for example be configured as a STATCOM (static synchronous compensator). It may comprise a power electronics voltage-source converter and may act either as a source or a sink of reactive AC power. The STATCOM is a member of the FACTS family of devices. A STATCOM may be a voltage source converter (VSC)-based device, with the voltage source behind a reactor. The voltage source may be created from a DC capacitor. The STATCOM may comprise a number of IGBTs.

As can be seen from FIG. 1, the reactive power compensation devices 103 and 105 are shunt connected, leaving one terminal floating.

Figure 2:
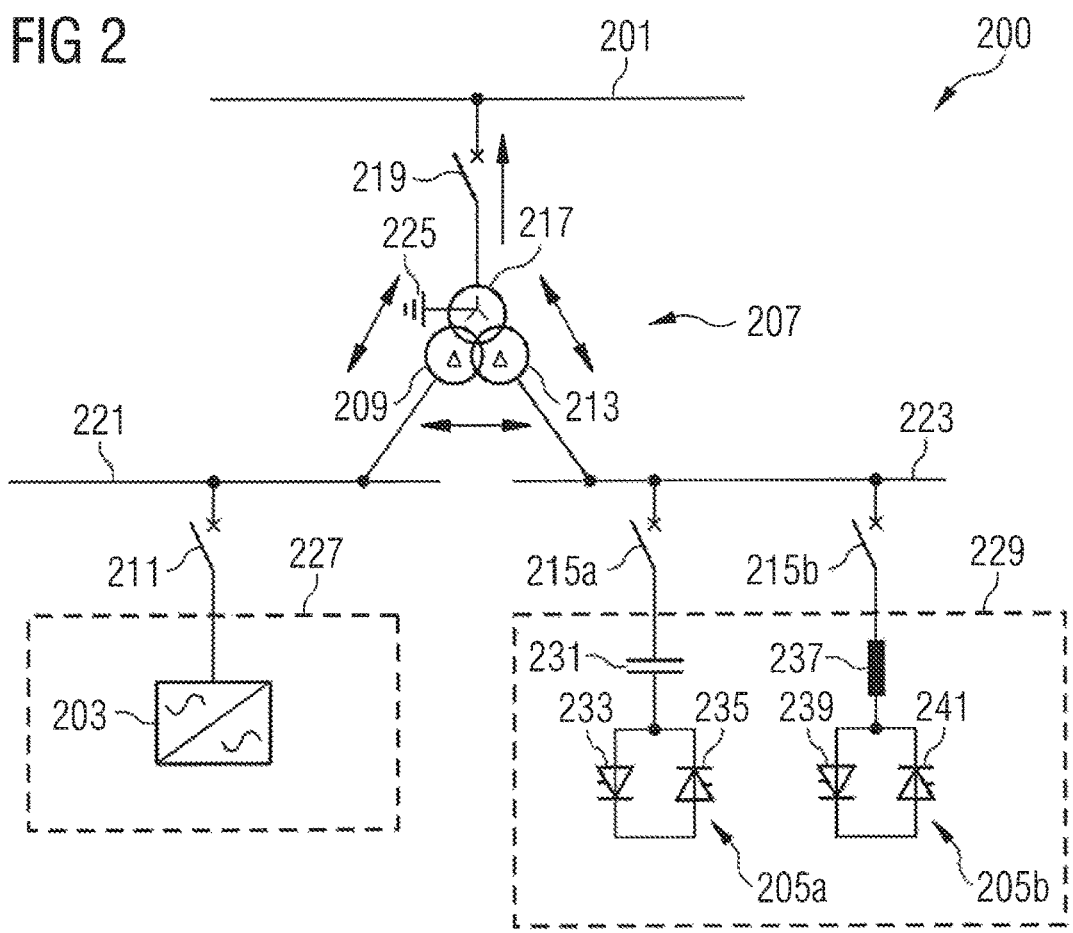
FIG. 2 schematically illustrates another embodiment of an arrangement for reactive power compensation.

FIG. 2 schematically illustrates another arrangement 200 for reactive power compensation according to an embodiment of the present invention, wherein elements similar in structure and/or function in FIGS. 1 and 2 are labelled with reference signs differing only in the first digit.

The electric energy transmission line 201 of the arrangement 200 illustrated in FIG. 2 operates at 380 kV having a current of e.g. 1000 A. The primary coil 217 may be configured in a star configuration, having a mid point connected to ground 225. The first bus bar 221 operates at 28 kV and allowing a current of e.g. 1000 A, while the second bus bar 223 operates at 19 kV allowing a current of e.g. 1000 A.

Via the switch 211, the first bus bar 221 and thus the first secondary coil 209 is connectable to a first group 227 of first reactive power compensation devices 203, wherein only one first reactive power compensation device 203 is illustrated in FIG. 2. However, the first group 227 and/or also the second group 229 may comprise more than one, such as two, three, four or even more second reactive power compensation devices.

The second secondary coil 213 is connected to the second bus bar 223 which is connectable, via switches 215a, 215b to a second group 229 of second reactive power compensation devices 205a, 205b, wherein the second group 229 may comprise only one or more than one, such as two, three, four or even more second reactive power compensation devices 205a, b, . . . . The second reactive power compensation device 205a is here configured as a thyristor-switched capacitor comprising a capacitor 231 and two thyristor valves 233 and 235 comprising plural thyristors each) connected in different orientations to the capacitor 231 and further shunt connected. The other second reactive power compensation device 205b is configured as a thyristor-switched reactor comprising a reactor (e.g. inductor or coil) 237 and two thyristors 239 and 241 which are connected to the reactor 237 in an opposite orientation and further shunt connected. Due to stray capacitance limitations, some of the device capable of reactive power compensation may not be enabled to be connected to a voltage higher than a certain threshold level, for example 19 kV.

The first reactive power compensation devices may be prone to produce a higher degree of harmonics or higher amplitudes of harmonics than the second reactive power compensation devices. To dampen these harmonics, the impedance between the first secondary coil 109 or 209 and the primary coil may be selected to be higher than the impedance between the second secondary coil and the primary coil. In particular, the equipment which injects harmonics into the network (in particular the first reactive power compensation devices or for example a VSC) may be electrically separated from the equipment which doesn't inject harmonics (such as the second reactive power compensation devices or in particular TSR, TSC). Thereby, it may be important to minimize the effect of injected harmonics into the network at the high voltage side of the transformer, i.e. at the primary side i.e. the primary coil 117, 217 of the transformer 107, 207.

It is therefore proposed to increase the impedance of the transformer 107, 207 between the primary coil 117, 217 and the first secondary coil 109, 209, making it higher than the impedance between the primary coil 117, 217 and the second secondary coil 113, 213. A high impedance between the primary coil 117, 217 and the first bus bar 121, 221 may have a beneficial effect on damping the harmonics injected by the first reactive power compensation device 103, 203 (in particular VSC) into the network. The harmonic voltage distortion at the high voltage side caused by the VSC could be estimated with the following formula:

$$V_{HV} = V_{VSC} * Z_{net}/(Z_{net} + Z_{tr\ HV-B1})$$

Where
- $V_{HV}$ is harmonic voltage distortion at HV side caused by VSC
- $V_{VSC}$—is harmonic voltage distortion caused by VSC
- $Z_{net}$ is HV network impedance
- $Z_{tr\ HV-B1}$ is impedance between HV winding (117, 217) and Busbar 1 (121, 221).

It is seen from the formula, that the higher impedance between HV winding and Busbar 1 lead to lower harmonic voltage distortion at HV side caused by VSC. The impedance between separate windings may depend on how the windings arranged around the transformer core. It is proposed to keep the Busbar 1 winding and Busbar 2 winding decoupled from each other. It may minimize the effect of one busbar to another. Therefore the harmonics injected by VSC may not flow into Busbar 2 and not cause additional stresses to the components connected to it.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. An arrangement for reactive power compensation at an electric energy transmission line, the arrangement comprising:
   at least one first reactive power compensation device including a first type of power electronic switches based on STATCOM technology;
   at least one second reactive power compensation device including a second type of power electronic switches not enabled to be controlled to enter a non-conductive state; and
   a transformer having a first secondary coil connected to said first reactive power compensation device, a second secondary coil connected to said second reactive power compensation device and a primary coil to be connected to the electric energy transmission line, said primary coil having more windings than either of said first or second secondary coils;
   said transformer having a first impedance between said primary coil and said first secondary coil being higher than a second impedance between said primary coil and said second secondary coil, enabling damping harmonics generated by said reactive power compensation devices.

2. The arrangement according to claim 1, wherein:
   said at least one first reactive power compensation device is part of a first group of reactive power compensation devices each having said first type of power electronic switches; and
   said at least one second reactive power compensation device is part of a second group of reactive power compensation devices each including said second type of power electronic switches.

3. The arrangement according to claim 2, wherein said first group and said second group of reactive power compensation devices are shunt connectable.

4. The arrangement according to claim 2, which further comprises:
   a first switch connected between said first secondary coil and said first reactive power compensation device for at least one or every first reactive power compensation device of said first group of reactive power compensation devices; and
   a second switch connected between said second secondary coil and said second reactive power compensation device for at least one or every second reactive power compensation device of said second group of reactive power compensation devices.

5. An electric transmission system, comprising:
   the electric energy transmission line; and
   an arrangement according to claim 2;
   said primary coil being connected to said electric energy transmission line; and
   said first group of reactive power compensation devices and said second group of reactive power compensation devices being shunt connected.

6. The arrangement according to claim 1, wherein:
   said first secondary coil has a first number of windings;
   said second secondary coil has a second number of windings; and
   said first number is different than said second number.

7. The arrangement according to claim 6, wherein said first number is larger than said second number.

8. The arrangement according to claim 1, wherein:
   said first type of power electronic switches are operable at a first operation voltage range;
   said second type of power electronic switches are operable at a second operation voltage range; and
   said first operation voltage range includes higher voltages than said second operation voltage range.

9. The arrangement according to claim 1, wherein:
   said first secondary coil has a first electrical rating; and
   said second secondary coil has a second electrical rating being different than said first electrical rating.

10. The arrangement according to claim 1, wherein said first type of power electronic switches are configured to be controlled to enter a non-conductive state.

11. The arrangement according to claim 10, wherein said first type of power electronic switches have a turn-off capability and include at least one of:
    an isolated gate bipolar transistor;
    an integrated gate-commutated thyristor; or
    a gate turn-off thyristor.

12. The arrangement according to claim 1, wherein said second type of power electronic switches include at least one of a thyristor switched capacitor or a thyristor switched reactor.

13. The arrangement according to claim 1, wherein said second secondary coil is decoupled from said first secondary coil.

14. The arrangement according to claim 1, wherein said transformer has a third secondary coil for auxiliary equipment.

15. The arrangement according to claim 14, wherein said third secondary coil has at least one of a lower electrical rating or a lower number of windings than either of said first or second secondary coils.

16. The arrangement according to claim 1, wherein the electric energy transmission line is operable at a voltage between 100 kV and 500 kV, said first secondary coil transforms to a voltage between 10 kV and 70 kV, and said second secondary coil transforms to a voltage between 10 kV and 50 kV.

17. A method of reactive power compensation at an electric energy transmission line, the method comprising the following steps:
    connecting a primary coil of a transformer to the electric energy transmission line;
    connecting a first secondary coil of the transformer to a first reactive power compensation device including a first type of power electronic switches based on STATCOM technology;
    connecting a second secondary coil of the transformer to a second reactive power compensation device including a second type of power electronic switches not enabled to be controlled to enter a non-conductive state; providing the primary coil with more windings than either of the first or second secondary coils; and
    providing the transformer with a first impedance between the primary coil and the first secondary coil being higher than a second impedance between the primary coil and the second secondary coil, enabling damping harmonics generated by the reactive power compensation devices.

* * * * *